United States Patent
Kimura

(10) Patent No.: US 10,226,968 B2
(45) Date of Patent: Mar. 12, 2019

(54) PNEUMATIC TIRE

(71) Applicant: SUMITOMO RUBBER INDUSTRIES LTD., Kobe-shi (JP)

(72) Inventor: Shinya Kimura, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 104 days.

(21) Appl. No.: 14/877,179

(22) Filed: Oct. 7, 2015

(65) Prior Publication Data

US 2016/0144664 A1 May 26, 2016

(30) Foreign Application Priority Data

Nov. 20, 2014 (JP) ................. 2014-235821

(51) Int. Cl.
*B60C 11/03* (2006.01)
*B60C 11/04* (2006.01)
(Continued)

(52) U.S. Cl.
CPC ...... *B60C 11/0327* (2013.01); *B60C 11/0304* (2013.01); *B60C 11/04* (2013.01);
(Continued)

(58) Field of Classification Search
CPC . B60C 11/0327; B60C 11/0304; B60C 11/12; B60C 11/1236; B60C 11/1369; B60C 11/00; B60C 11/0066; B60C 11/04; B60C 2011/0358; B60C 2011/0372; B60C 2011/036; B60C 2011/0365; B60C 2011/0381; B60C 2011/0383; B60C 11/11; B60C 3/06; B60C 2011/0341; B60C 2011/0353
USPC .................................. 152/209.22
See application file for complete search history.

(56) References Cited

U.S. PATENT DOCUMENTS 5,616,194 A * 4/1997 Lim .................... B60C 11/0306
152/209.18
2003/0024621 A1 2/2003 Neugebauer et al.
(Continued)

FOREIGN PATENT DOCUMENTS

EP 1 566 291 A1 8/2005
EP 1 674 293 A2 6/2006
(Continued)

OTHER PUBLICATIONS

Nishigata (JP 2003-182315, 2003, machine translation).*
Matsushita (JP 05069706, 1993, machine translation).*

*Primary Examiner* — Robert C Dye
*Assistant Examiner* — Sedef E Paquette
(74) *Attorney, Agent, or Firm* — Oblon, McClelland, Maier & Neustadt, L.L.P.

(57) ABSTRACT

A pneumatic tire includes a tread having a first tread edge, main grooves in tire circumferential direction, lands bordered by the main grooves, and lateral grooves crossing through the lands. Each land includes a first section having the first tread edge, a second section adjacent to an inner side of the first section, and a third section adjacent to an inner side of the second section, each lateral groove includes first, second and third grooves in the sections, respectively, each lateral groove has an outer portion that extends from first tread-edge side land periphery and a sipe portion that is connected to the outer portion and extends to the other land periphery opposite a first tread-edge side, and the lateral grooves satisfy A1>A2>A3 and B1<B2<B3, where A1, A2 and A3 represent axial lengths of the outer portions, and B1, B2 and B3 represent axial lengths of the sipe portions.

20 Claims, 6 Drawing Sheets

(51) Int. Cl.
   *B60C 11/13*     (2006.01)
   *B60C 11/11*     (2006.01)
   *B60C 11/12*     (2006.01)

(52) U.S. Cl.
   CPC ........... *B60C 11/11* (2013.01); *B60C 11/1236*
         (2013.01); *B60C 11/1369* (2013.01); *B60C*
         *2011/0341* (2013.01); *B60C 2011/0372*
         (2013.01); *B60C 2011/0374* (2013.01); *B60C*
         *2011/0381* (2013.01); *B60C 2011/0383*
         (2013.01); *B60C 2011/1209* (2013.01)

(56)         References Cited

U.S. PATENT DOCUMENTS

2006/0011279  A1    1/2006   Miyasaka
   2006/0137789  A1    6/2006   Shirouzu
   2009/0255614  A1   10/2009   Ebiko 2010/0326577  A1*  12/2010   Iwai .................... B60C 11/0309
                                                                    152/209.24
   2013/0112325  A1*   5/2013   Mukai ................. B60C 11/1369
                                                                    152/209.8
   2013/0192731  A1*   8/2013   Oji ...................... B60C 11/0302
                                                                    152/209.8
   2015/0151588  A1*   6/2015   Munezawa ............. B60C 11/04
                                                                    152/209.25

FOREIGN PATENT DOCUMENTS

EP        2 108 531 A2       10/2009
   JP          05069706 A   *    3/1993   ......... B60C 11/0318
   JP          08048114 A   *    2/1996
   JP        2003-182315 A       7/2003
   JP         2003182315 A  *    7/2003
   JP         2008302710 A  *   12/2008   ......... B60C 11/1369
   JP        2012-116306 A       6/2012
   JP      WO 2013137193 A1 *    9/2013   ............. B60C 11/04

* cited by examiner

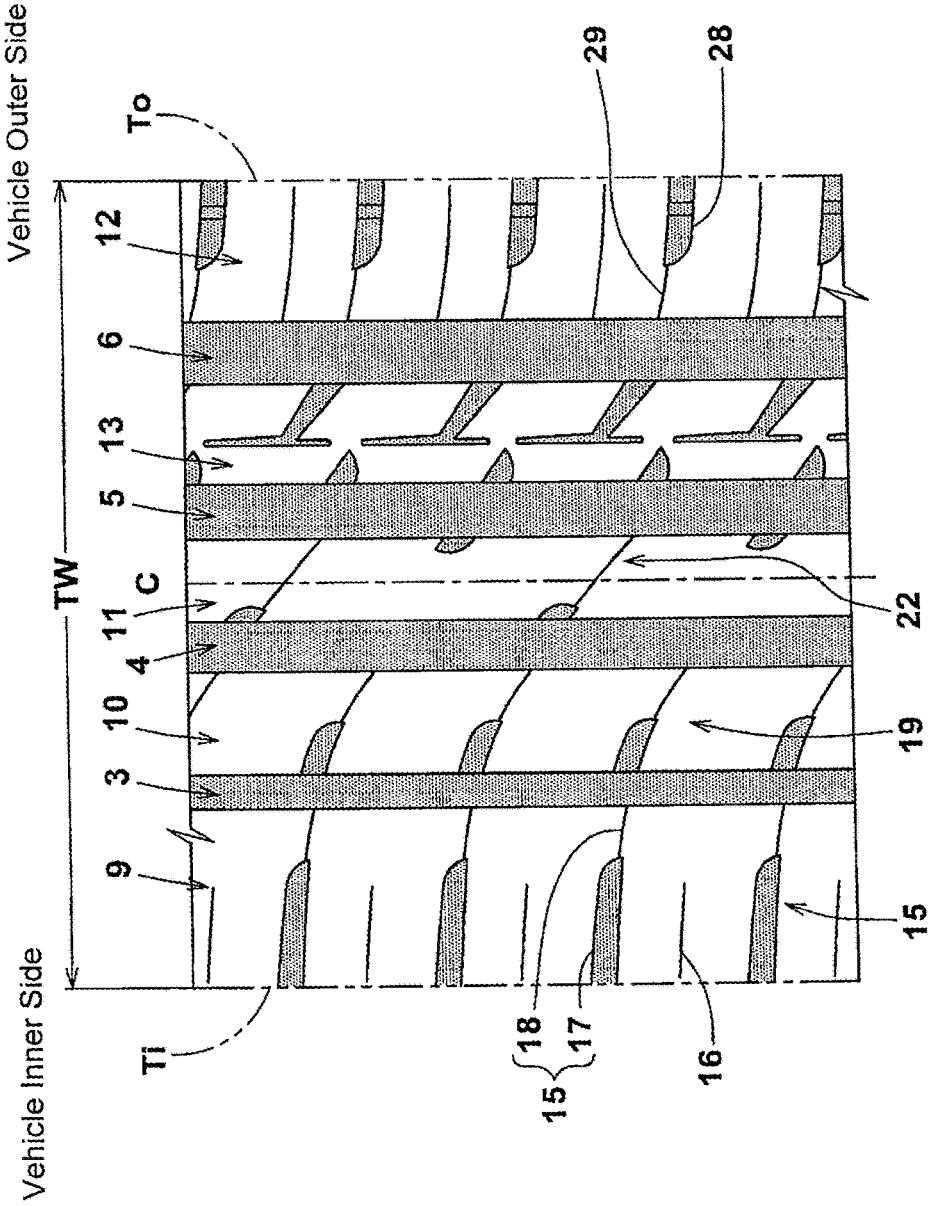

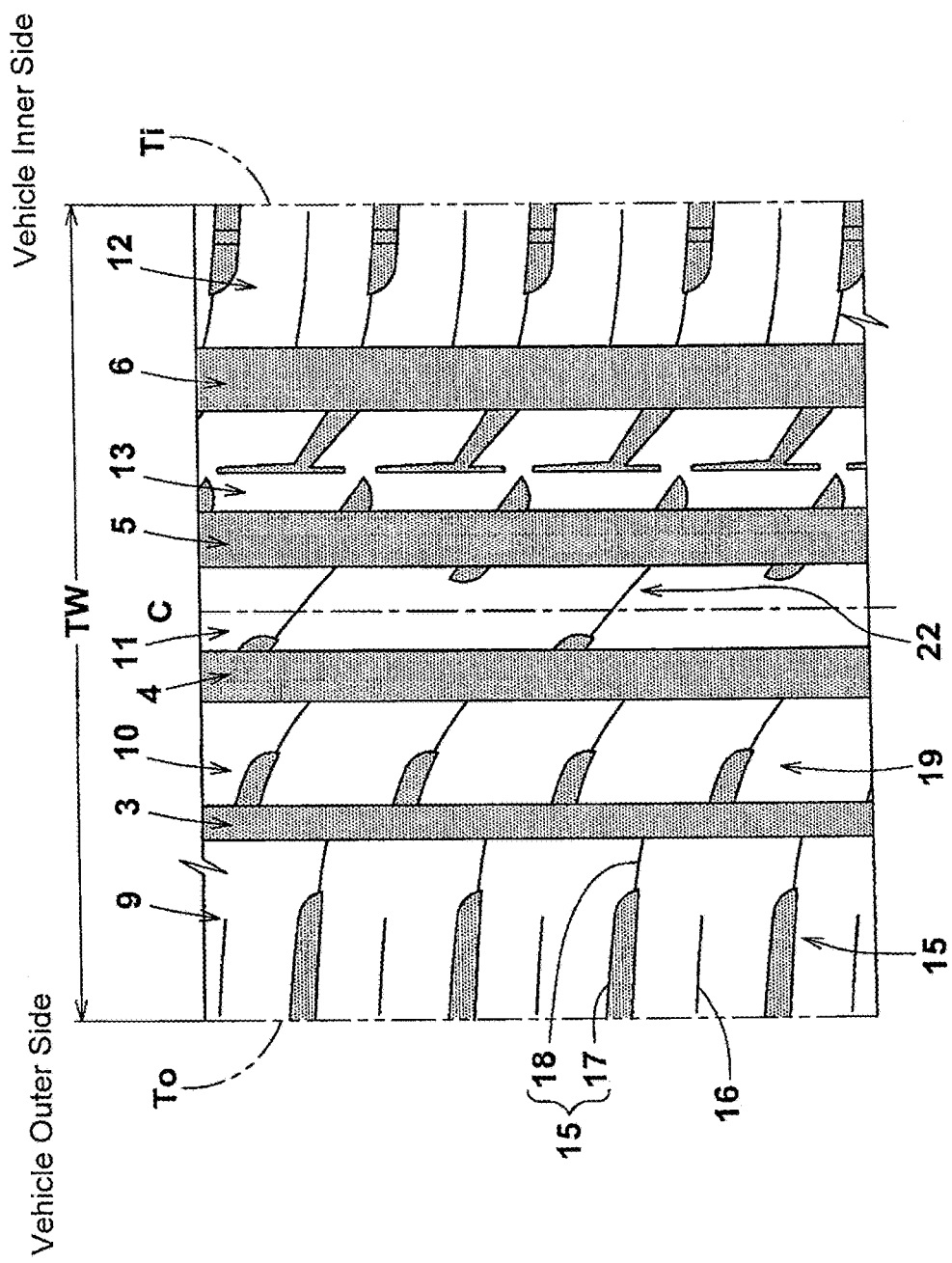

PNEUMATIC TIRE

CROSS-REFERENCE TO RELATED APPLICATIONS

The present application is based upon and claims the benefit of priority to Japanese Patent Application No. 2014-235821, filed Nov. 20, 2014, the entire contents of which are incorporated herein by reference.

BACKGROUND OF THE INVENTION

Field of the Invention

The present invention relates to a pneumatic tire that exhibits well-balanced enhancement of wear resistance while maintaining high wet performance.

Description of Background Art

JP2012-116306A describes a pneumatic tire. The entire contents of this publication are incorporated herein by reference.

SUMMARY OF THE INVENTION

According to one aspect of the present invention, a pneumatic tire includes a tread having a first tread edge, main grooves each extending continuously in a tire circumferential direction, land portions bordered by the main grooves, and lateral grooves crossing through the land portions. Each of the land portions includes a first land section having the first tread edge, a second land section adjacent to an inner side of the first land section, and a third land section adjacent to an inner side of the second land section, each of the lateral grooves includes a first lateral groove, a second lateral groove and a third lateral groove formed in the first land section, the second land section and the third land section, respectively, each of the lateral grooves is formed such that each of the lateral grooves has an outer portion that extends from a first tread-edge side land periphery and a sipe portion that is connected to the outer portion and extends to the other land periphery opposite a first tread-edge side, and the lateral grooves satisfy A1>A2>A3 and B1<B2<B3, where A1 represents a tire axial length of the outer portion of the first lateral groove, A2 represents a tire axial length of the outer portion of the second lateral groove, A3 represents a tire axial length of the outer portion of the third lateral groove, B1 represents a tire axial length of the sipe portion of the first lateral groove, B2 represents a tire axial length of the sipe portion of the second lateral groove, and B3 represents a tire axial length of the sipe portion of the third lateral groove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a developing view of a tread according to another embodiment; and

FIG. 6 is a developing view of a tread according to yet another embodiment.

DETAILED DESCRIPTION OF THE EMBODIMENTS

Figure 1:
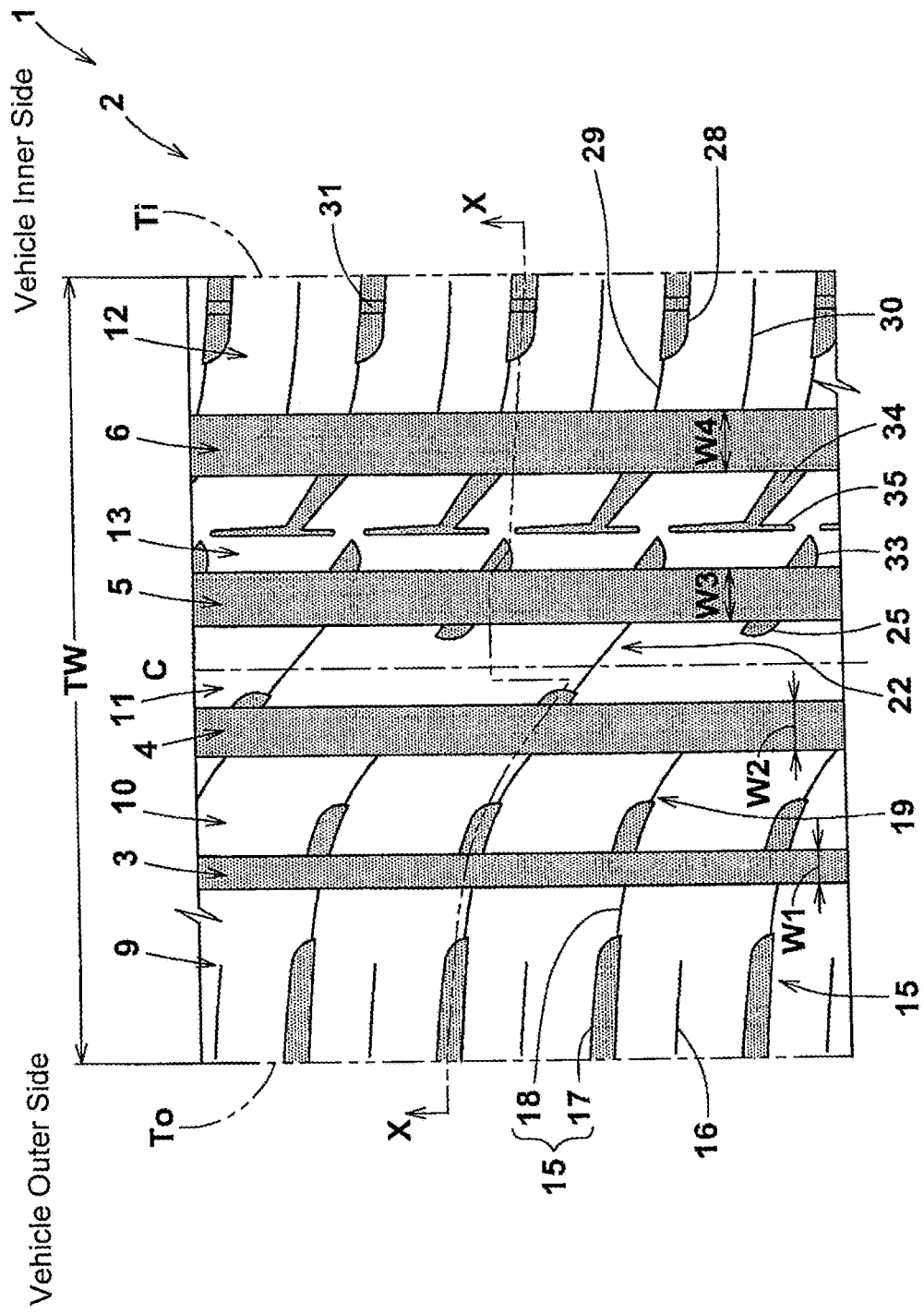
FIG. 1 is a developing view of the tread of a pneumatic tire according to an embodiment of the present invention.

The embodiments will now be described with reference to the accompanying drawings, wherein like reference numerals designate corresponding or identical elements throughout the various drawings.

FIG. 1 shows a developing view of tread 2 of pneumatic tire 1 according to an embodiment of the present invention. Pneumatic tire 1 of the present embodiment (hereinafter may be simply referred to as "tire") is preferably mounted on a passenger car, for example.

As shown in FIG. 1, tread 2 has an asymmetrical tread pattern to be positioned in a specified direction when the tire is mounted on a vehicle. Tread 2 has first tread edge (To) to be positioned on the outer side of a vehicle when mounted and second tread edge (Ti) to be positioned on the vehicle inner side. The direction for mounting on a vehicle is denoted by lettering or the like on a tire sidewall (not shown), for example.

The aforementioned tread edges (To, Ti) are determined as tire axially outermost contact-patch positions when a normal load is exerted on tire 1 under normal conditions, that is, the tire is mounted on a normal rim and filled with air at a normal inflation pressure with no load exerted thereon, and when the tire is brought into contact with a planar surface with a camber angle of zero degrees. The tire axial distance between tread edges (To, Ti) of a tire under normal conditions is determined as tread contact-patch width (TW). Unless otherwise specified, measurements or the like of tire members are those obtained when the tire is under normal conditions.

A "normal rim" indicates a rim specified for each tire by a regulatory system that includes standards for the tire: it is specified, for example, as a "Normal Rim" by JATMA, "Design Rim" by TRA, and "Measuring Rim" by ETRTO.

A "normal inflation pressure" indicates air pressure specified for each tire by a regulatory system that includes standards for the tire. For example, it is specified as "Maximum Air Pressure" by JATMA, maximum value listed in a table "Tire Load Limits at Various Cold Inflation Pressures" by TRA, and "Inflation Pressure" by ETRTO. When tire 1 is for a passenger car, the normal inflation pressure is set at 180 kPa.

"Normal load" indicates the load specified for each tire by a regulatory system that includes standards for the tire. For example, it is specified as "Maximum Load Capacity" by JATMA, maximum value listed in a table "Tire Load Limits at Various Cold Inflation Pressures" by TRA, and "Load Capacity" by ETRTO. When tire 1 is for a passenger car, the normal load is set at 88% of the above load.

Multiple main grooves are formed in tread 2 to extend continuously in a tire circumferential direction.

In the present embodiment, main grooves include first main groove 3, second main groove 4, third main groove 5 and fourth main groove 6. First main groove 3 is positioned closest to first tread edge (To). Second main groove 4 is positioned closer to second tread edge (Ti) than first main groove 3 is, and is adjacent to first main groove 3. Third main groove 5 is positioned closer to second tread edge (Ti) than second main groove 4 is, and is adjacent to second main groove 4. Fourth main groove 6 is positioned closest to second tread edge (Ti), and is adjacent to third main groove 5.

Main grooves (3 to 6) are formed in a straight line in a tire circumferential direction. Such main grooves (3 to 6) enhance the rigidity and wear resistance of land portions near main grooves (3 to 6). In addition, since main grooves (3 to 6) are capable of discharging water in the grooves smoothly toward the rear of the tire rotation, wet performance is enhanced.

In the present embodiment, the groove width of a main groove on the vehicle inner side is set greater than that of a main groove on the vehicle outer side. Greater force is exerted on the vehicle outer side than on the vehicle inner side during cornering. Thus, to reduce the difference in degrees of wear between land portions on the vehicle outer side and on the inner side, the tire axial rigidity of each land portion is to be set based on the lateral force exerted thereon. Therefore, groove width (W4) of fourth main groove 6 is preferred to be greater than groove width (W1) of first main groove 3. In addition, it is harder to discharge water between the contact patch and the ground from a land portion next to tire equator (C) than from land portions closer to tread edges (To, Ti). Thus, groove widths (W2, W3) of second main groove 4 and third main groove 5 are preferred to be set greater than groove width (W1) of first main groove 3 so as to efficiently improve drainage capability. However, the groove widths of main grooves are not limited to such settings.

To efficiently achieve the above effects, groove width (W1) of first main groove 3 is preferred to be 1.5%~5.5% of tread contact-patch width (TW); groove width (W2) of second main groove 4 is preferred to be 4%~8% of tread contact-patch width (TW); groove width (W3) of third main groove 5 is preferred to be 4.5%~8.5% of tread contact-patch width (TW); and groove width (W4) of fourth main groove 6 is preferred to be 5.5%~9.5% of tread contact-patch width (TW). Each groove depth (D1) of main grooves (3 to 6) (shown in FIG. 2) is preferred to be 7.0~9.5 mm, although that is not the only option.

On tread 2, first land section 9, second land section 10, third land section 11, fourth land section 12 and fifth land section 13 are respectively bordered by main grooves (3 to 6).

First land section 9 is bordered by first tread edge (To) and first main groove 3; second land section 10 is bordered by first main groove 3 and second main groove 4; third land section 11 is bordered by second main groove 4 and third main groove 5; fourth land section 12 is bordered by second tread edge (Ti) and fourth main groove 6; and fifth land section 13 is bordered by third main groove 5 and fourth main groove 6.

Figure 3:
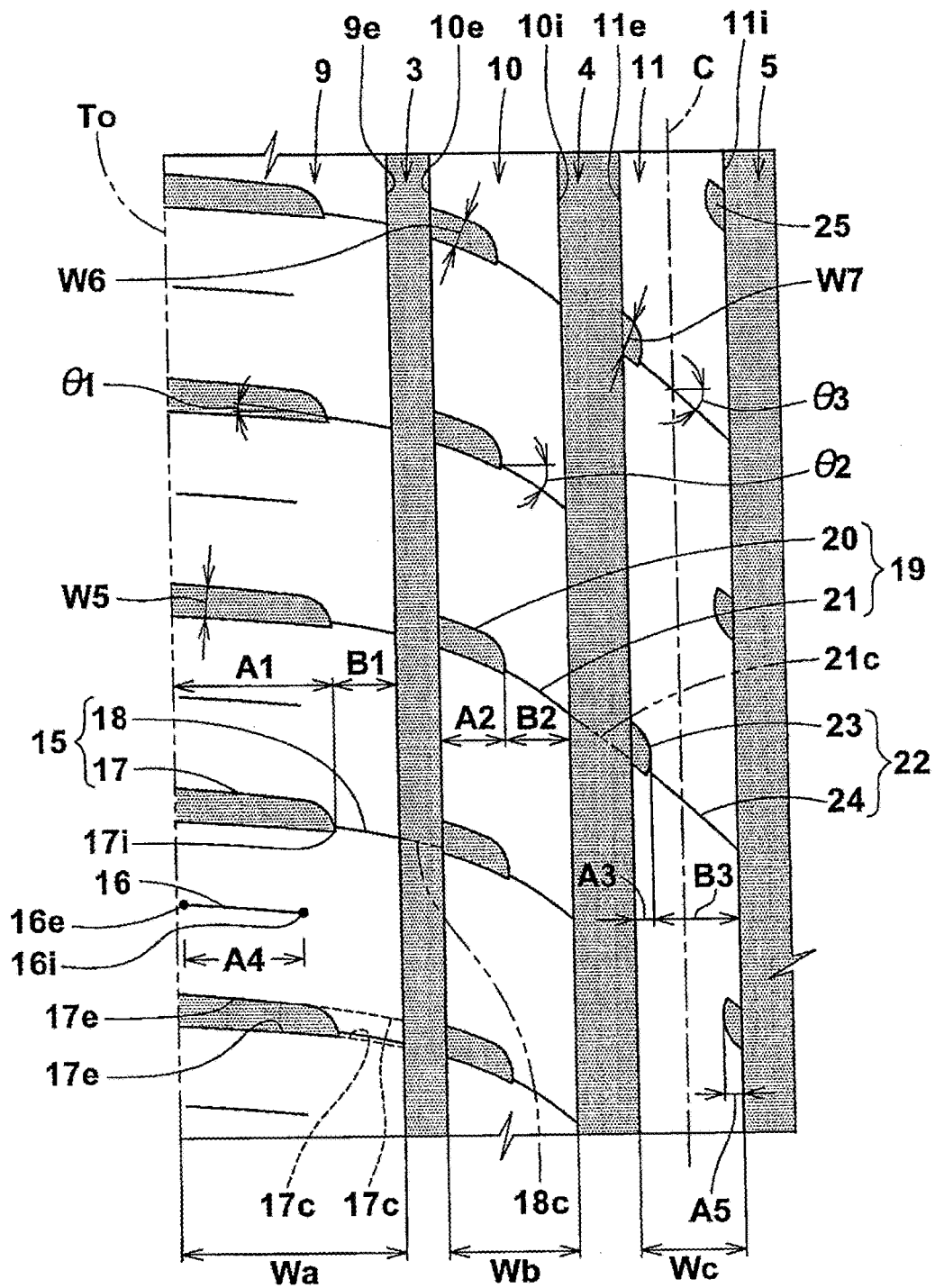
FIG. 3 is an enlarged view of the tread on the vehicle outer side shown in FIG. 1.

FIG. 3 is an enlarged view showing from first land section 9 to third land section 11. As shown in FIG. 3, first land section 9 has first lateral groove 15 crossing first land section 9 and first sipe 16 between tire circumferentially adjacent first lateral grooves (15, 15), which are alternately formed in a tire circumferential direction.

First lateral groove 15 includes outer portion 17 that extends from first tread edge (To) and sipe portion 18 that is connected to outer portion 17 and extends to land periphery (9e) of first land 9 on the second tread-edge (Ti) side. First lateral groove 15 discharges water from outer portion 17 to tread edge (To), thus enhancing wet performance. In addition, sipe portion 18 maintains high circumferential rigidity of first land section 9, thus enhancing wear resistance. Moreover, sipe portion 18 sucks up water screen between the ground and the contact patch at first land section 9, helping improve drainage capability. In the present application, a "sipe portion" is a slit having a width less than 1.5 mm.

Outer portion 17 and sipe portion 18 make the same inclination relative to a tire axial direction in the present embodiment. By so setting, the rigidity of first land section 9 is prevented from lowering at the intersection of outer portion 17 and sipe portion 18. In the present embodiment, outer portion 17 and sipe portion 18 make a smooth transition. When first lateral groove 15 is structured as above, the rigidity of first land section 9 is maintained even better. Making a "smooth transition" means sipe portion 18 is formed between virtual lines (17c, 17c) obtained by smoothly extending both groove peripheries (17e, 17e) of outer portion 17 toward second tread edge (Ti). The definition also applies to later-described second lateral groove 19 and third lateral groove 22.

Outer portion 17 and sipe portion 18 extend in an arc shape. By so setting, resistance during the discharge of water from the groove is minimized, and wet performance is thereby enhanced.

Groove width (W5) of outer portion 17 is preferred to be, for example, 1%~5% of tread contact-patch width (TW) to enhance both wear resistance and wet performance.

First sipe 16 is structured to have both ends (16e, 16e) terminate within first land section 9 and to make the same inclination as outer portion 17 of first lateral groove 15. Such first sipe 16 maintains high tire axial rigidity of first land section 9.

Inner end (16i) of first sipe 16 is positioned on the tire axially outer side of inner end (17i) of outer portion 17. Namely, first sipe 16 does not overlap sipe portion 18 in a tire axial direction. Such first sipe 16 helps to discharge more water by opening up groove peripheries (17e, 17e) of outer portion 17 in first lateral groove 15 at the time of ground contact while significantly maintaining the pattern rigidity of first land section 9 on the tire equator side.

To suppress the tire circumferential rigidity of first land section 9 from decreasing excessively, tire axial length (A4) of first sipe 16 is preferred to be shorter than tire axial length (A1) of outer portion 17. Tire axial length (A4) of first sipe 16 is more preferred to be 65%~85% of tire axial length (A1) of outer portion 17.

Second land section 10 is provided with second lateral groove 19 that crosses through second land section 10. Second lateral groove 19 includes outer portion 20 that extends from land periphery (10e) of second land section 10 on the first tread-edge (To) side as well as sipe portion 21 that is connected to outer portion 20 and extends to land periphery (10i) of second land section 10 on the second tread-edge (Ti) side. By so setting, wet performance and wear resistance are also enhanced in second land section 10.

Outer portion 20 and sipe portion 21 make the same inclination relative to a tire axial direction. Such a structure suppresses a decrease in the rigidity of second land section 10 at the intersection of outer portion 20 and sipe portion 21. In the present embodiment, outer portion 20 and sipe portion 21 make a smooth transition.

Outer portion 20 and sipe portion 21 extend in an arc shape. By so setting, the resistance during the discharge of water from the groove is minimized, and wet performance is thereby enhanced.

Outer portion 20 of second lateral groove 19 makes a smooth transition to sipe portion 18 of first lateral groove 15 when connected through first main groove 3. Such a structure properly reduces the pattern rigidity of first land section 9 near sipe portion 18 of first lateral groove 15, thereby increasing the opening of sipe portion 18 at the time of ground contact. Accordingly, wet performance is enhanced. Making a "smooth transition" means virtual line (18c) obtained by extending sipe portion 18 of first lateral groove 15 toward tire equator (C) is connected to outer portion 20 of second lateral groove 19.

The same as above, third land section 11 is provided with third lateral groove 22 that crosses through third land section 11. Third lateral groove 22 includes outer portion 23 that extends from land periphery (11e) of third land section 11 on the first tread-edge (To) side and sipe portion 24 that is connected to outer portion 23 and extends to land periphery (11i) of third land section 11 on the second tread-edge (Ti) side.

Outer portion 23 and sipe portion 24 make the same inclination relative to a tire axial direction. Such a structure suppresses a decrease in the rigidity of third land section 11 at the intersection of outer portion 23 and sipe portion 24. In the present embodiment, outer portion 23 and sipe portion 24 make a smooth transition.

Outer portion 23 of third lateral groove 22 makes a smooth transition to sipe portion 21 of second lateral groove 19 when connected through second main groove 4. Such a structure properly reduces the pattern rigidity of second land section 10 near sipe portion 21 of second lateral groove 19, thereby increasing the opening of sipe portion 21 at the time of ground contact. Accordingly, wet performance is enhanced. Making a "smooth transition" means virtual line (21c) obtained by extending sipe portion 21 of second lateral groove 19 toward tire equator (C) is connected to outer portion 23 of third lateral groove 23.

In the present embodiment, first lateral groove 15, second lateral groove 19 and third lateral groove 22 are set to satisfy the formulas (1) and (2) below.

$$A1>A2>A3 \quad (1)$$

$$B1<B2<B3 \quad (2)$$

In the above formulas, (A1) to (A3) indicate respectively the tire axial lengths of outer portions (17, 20, 23) of first lateral groove 15 to third lateral groove 22, and (B1) to (B3) indicate respectively the tire axial lengths of sipe portions (18, 21, 24) of first lateral groove 15 to third lateral groove 22.

The contact-patch pressure at the tread-edge side land portion may be lower than that at an inner land portion when a vehicle runs straight. To prevent differences in the degree of wear in land portions, their tire circumferential rigidities are to be set based on the distribution of contact-patch pressures. Thus, the tire axial lengths of outer portions are set to gradually decrease from first land section 9 toward third land section 11 so that tire circumferential rigidities increase from first land section 9 toward third land section 11. By so setting, degrees of wear are made almost uniform in first land section 9 through third land section 11.

However, when tire axial lengths A1~A3 of outer portions are decreased from first land section 9 toward third land section 11, the drainage capability is lowered in first land section 9. When the tire axial lengths of sipe portions are gradually increased from first land section 9 toward third land section 11, the ability to suck up water screen under first land section 9 is increased and the drainage capability is enhanced accordingly. As described above, well-balanced enhancement of wear resistance and wet performance is achieved in the present embodiment by respectively specifying the tire axial lengths of the outer portions and sipe portions of lateral grooves (15, 19, 22) in first land section 9 to third land section 11.

To effectively exhibit the above effects, length (A1) of outer portion 17 of first lateral groove 15 is preferred to be 10%~20% of tread contact-patch width (TW); length (A2) of outer portion 20 of second lateral groove 19 is preferred to be 0.3~0.6 times the length (A1) of outer portion 17 of first lateral groove 15; length (A3) of outer portion 23 of third lateral groove 22 is preferred to be 0.2~0.5 times the length (A2) of outer portion 20 of second lateral groove 19; length (B1) of sipe portion 18 of first lateral groove 15 is preferred to be 2%~12% of tread contact-patch width (TW); length (B2) of sipe portion 21 of second lateral groove 19 is preferred to be 1.05~1.2 times the length (B1) of sipe portion 18 of first lateral groove 15; and length (B3) of sipe portion 24 of third lateral groove 22 is preferred to be 1.1~1.6 times the length (B2) of sipe portion 21 of second lateral groove 19.

In the present embodiment, lateral grooves as specified above are provided for land portions on the vehicle outer side. When a vehicle turns, a greater lateral force is exerted on a land portion on the vehicle outer side than on a land portion on the vehicle inner side. Thus, when lateral grooves (15, 19, 22) of first land section 9 to third land section 11 are specified as described above, water screen under the contact patch of each land portion can be smoothly discharged toward main grooves (3, 4) or toward tread edge (To) by using lateral force. Accordingly, wet performance is efficiently enhanced.

First lateral groove 15, second lateral groove 19 and third lateral groove 22 are preferred to satisfy the formula (3) below.

$$\theta 1<\theta 2<\theta 3 \quad (3)$$

In the above formula, (θ1)~(θ3) are angles of lateral grooves (15, 19, 22) relative to a tire axial direction. In the present embodiment, those angles are measured at each center position of lateral grooves (15, 19, 22) in a tire axial direction.

During a straight run, contact-patch pressure may be greatest on the land portion near tire equator (C). By contrast, during cornering, lateral force is greater on a land portion positioned on the first tread-edge (To) side. Therefore, the tire axial rigidity is increased in first land section 9 while the tire circumferential rigidity is increased in third land section 11 so that different degrees of wear caused during cornering and during a straight run are reduced among land portions. In addition, water in outer portions (17, 20, 23) is efficiently discharged using lateral force or tire circumferential force. Accordingly, when angles (θ1) (θ3) of lateral grooves (15, 19, 22) are specified as above, even better-balanced enhancement of wear resistance and wet performance is achieved.

To effectively exhibit the above effects, angle (θ1) of first lateral groove 15 is preferred to be 0~15 degrees; angle (θ2) of second lateral groove 19 is preferred to be 20~40 degrees; and angle (θ3) of third lateral groove 22 is preferred to be 35~55 degrees. When angle (θ3) of third lateral groove 22 is excessive, the tire axial rigidity of third land section 11 may decrease.

To secure tire axial lengths of outer portions (17, 20, 23) and sipe portions (18, 21, 24) while effectively achieving the above effects, maximum tire axial width (Wa) of first land section 9 is preferably set at 17%~27% of tread contact-patch width (TW) (see FIG. 1); maximum tire axial width (Wb) of second land section 10 is preferably set at 7%~17% of tread contact-patch width (TW); and maximum tire axial width (Wc) of third land section 11 is preferably set at 5%~15% of tread contact-patch width (TW).

The total number of first lateral grooves 15 is preferred to be the same as that of second lateral grooves 19. The total number of first lateral grooves 15 is preferred to be greater than that of third lateral grooves 22. By so setting, degrees of wear in first land section 9 through third land section 11 are more likely to be uniform while maintaining the tire circumferential rigidity of third land section 11 where the contact-patch pressure is greater. In the present embodiment, the total number of first lateral grooves 15 is twice that of third lateral grooves 22.

Groove widths (W5~W7) (maximum widths) of outer portions (17, 20, 23) of first lateral groove 15 to third lateral groove 22 are preferred to be 1%~5% of tread contact-patch width (TW). In addition, to achieve well-balanced enhancement of wet performance and wear resistance, groove width (W5) of outer portion 17 of first lateral groove 15 is preferred to be 90%~110% of groove width (W6) of outer portion 20 of second lateral groove 19; and groove width (W6) of outer portion 20 of second lateral groove 19 is preferred to be 90%~110% of groove width (W7) of outer portion 23 of third lateral groove 22.

Figure 2:
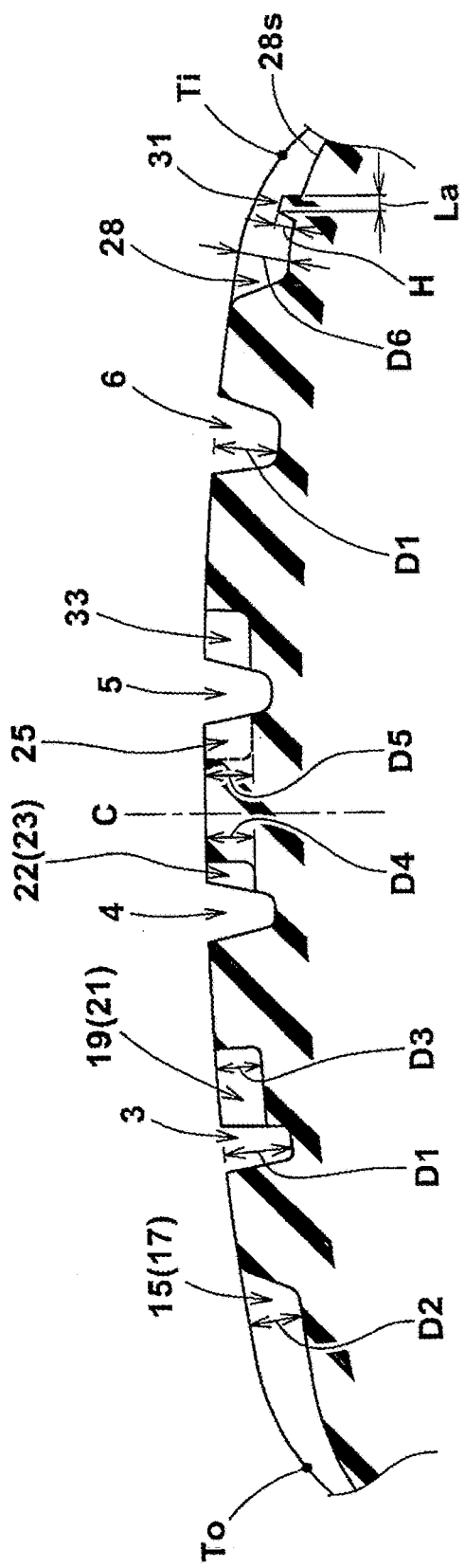
FIG. 2 is a cross-sectional view taken at the X-X line in FIG. 1.

As shown in FIG. 2, groove depth (D2) (maximum depth) of outer portion 17 of first lateral groove 15 is not limited specifically, but is preferred to be 70%~90% of groove depth (D1) of first main groove 3. Groove depth (D3) of outer portion 20 of second lateral groove 19 and groove depth (D4) of outer portion 23 of third lateral groove 22 are preferably set at 60%~80% of groove depth (D1) of first main groove 3. Depths of sipe portions (18, 21, 24) (not shown) are preferably set at 40%~70% of groove depth (D1) of first main groove 3.

In third land section 11, first lug groove 25 extends from third main groove 5 toward first tread edge (To) and terminates within third land section 11 as shown in FIG. 3. Lug groove 25 achieves well-balanced pattern rigidity on axially both sides of third land section 11 so that the degrees of wear on tire axially both sides of third land section 11 are more likely to be uniform. From those viewpoints, tire axial length (A5) of first lug groove 25 is preferred to be 90%~110% of tire axial length (A3) of outer portion 23 of third lateral groove 22. Groove depth (D5) of first lug groove 25 (shown in FIG. 2) is set at 60%~80% of groove depth (D1) of third main groove 5.

Figure 4:
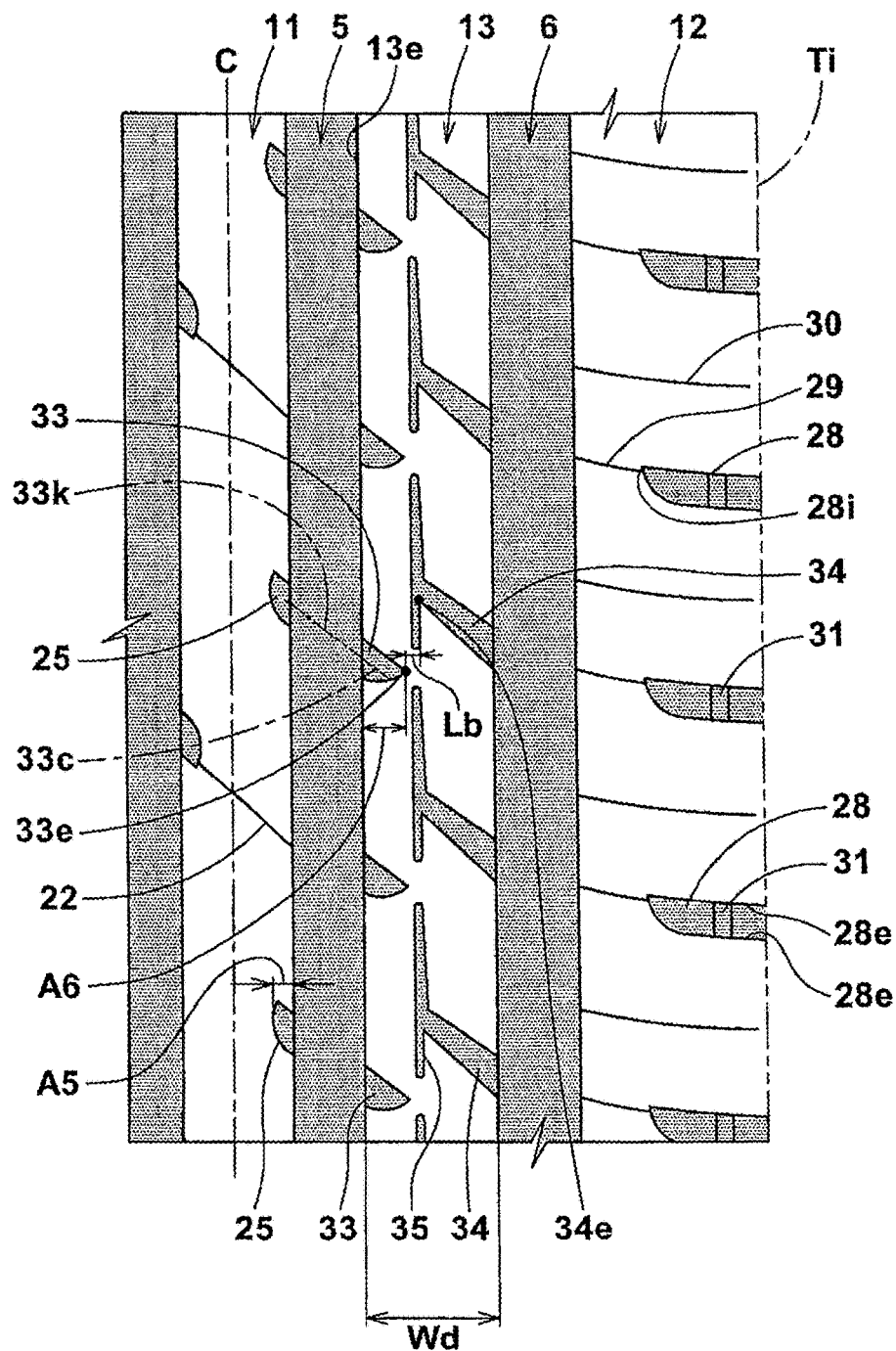
FIG. 4 is an enlarged view of the tread on the vehicle inner side shown in FIG. 1.

FIG. 4 is an enlarged view of land portions positioned on the vehicle inner side as shown in FIG. 1. In fourth land section 12, inner shoulder lug groove 28, first inner shoulder sipe 29, and second inner shoulder sipe 30 are formed as shown in FIG. 4.

Inner shoulder lug groove 28 extends from second tread edge (Ti) toward first tread edge (To) and includes inner edge (28i) that terminates within fourth land section 12. Such inner shoulder lug groove 28 maintains the high rigidity of fourth land section 12, and is capable of smoothly discharging water screen under the contact patch of fourth land section 12 toward second tread edge (Ti).

As shown in FIG. 2, inner shoulder lug groove 28 is provided with tie bar 31 elevated from groove bottom (28s). Such tie bar 31 suppresses deformation of inner shoulder lug groove 28 and also suppresses skidding around groove peripheries (28e, 28e) (shown in FIG. 4) of inner shoulder lug groove 28. Accordingly, wear at groove peripheries (28e, 28e) is suppressed.

Height (H) of tie bar 31 measured from the bottom of inner shoulder lug groove 28 is preferred to be 60%~80% of maximum groove depth (D6) of inner shoulder lug groove 28. Length (La) of tie bar 31 along inner shoulder lug groove 28 is preferably 1~3 mm. Such tie bar 31 effectively suppresses a decrease in drainage capability and skidding at groove periphery (28e) of inner shoulder lug groove 28.

As shown in FIG. 4, first inner shoulder sipe 29 connects fourth main groove 6 and inner end (28i) of inner shoulder lug groove 28. Accordingly, fourth land section 12 achieves greater pattern rigidity on the tire equator (C) side.

Second inner shoulder sipe 30 extends from fourth main groove 6 toward second tread edge (Ti) and terminates within fourth land section 12. Such second inner shoulder sipe 30 sucks up water screen under fourth land section 12 and discharges it toward fourth main groove 6. Second inner shoulder sipe 30 is not limited to such a structure, and may cross through fourth land section 12.

In fifth land section 13, second lug groove 33, third lug groove 34 and longitudinal thin groove 35 are formed.

Second lug groove 33 extends from land periphery (13e) on the first tread-edge (To) side toward the second tread-edge (Ti) side of fifth land section 13 and has inner end (33e) that terminates within fifth land section 13. Accordingly, water screen under the contact patch of fifth land section 13 is also discharged effectively toward third main groove 5.

Second lug groove 33 makes a smooth transition to first lug groove 25 when connected through third main groove 5. By so setting, in third land section 11 and fifth land section 13 near second lug groove 33 and first lug groove 25, pattern rigidity is properly lowered and grooves (25, 33) are more easily opened. Accordingly, more water screen is sucked up in the grooves and discharged toward third main groove 5. Making a "smooth transition" means first lug groove 25 connects with virtual line (33k) obtained by smoothly extending groove center line (33c) of second lug groove 33 toward first tread edge (To).

To achieve well-balanced enhancement of wet performance and wear resistance, tire axial length (A6) of second lug groove 33 is preferred to be 1.5~2.5 times the tire axial length (A5) of first lug groove 25.

Third lug groove 34 extends from fourth main groove 6 toward first tread edge (To) and has inner end (34e) that terminates within fifth land section 13.

Third lug groove 34 does not overlap second lug groove 33 in a tire axial direction. Accordingly, the tire circumferential rigidity of fifth land section 13 is maintained well. To achieve well-balanced enhancement of wear resistance and wet performance, tire axial distance (Lb) between inner end (33e) of second lug groove 33 and inner end (34e) of third lug groove 34 is preferably set at 5%~15% of tire axial maximum width (Wd) of fifth land section 13.

Longitudinal thin groove 35 is formed straight and extends in a tire circumferential direction. Both ends of longitudinal thin groove 35 are arrayed in a tire circumferential direction and terminate within fifth land section 13. Such longitudinal thin groove 35 enhances drainage capability while maintaining high circumferential rigidity in fifth land section 13.

Longitudinal thin groove 35 is communicated with inner end (34e) of third lug groove 34. Accordingly, water screen in longitudinal thin groove 35 is discharged to fourth main groove 6 through third lug groove 34.

So far, embodiments of the present invention are described in detail. However, the present invention is not limited to the above. Needless to say, various modifications are possible to carry out the present invention.

EXAMPLES

Pneumatic test tires in size 215/60R17 for a passenger car were prepared to have the basic pattern shown in FIG. 1 according to specifications shown in Table 1. Their wear resistance and wet performance were tested. Common specifications of test tires and test methods are as follows.
 tread contact-patch width (TW): 158 mm
 groove depth of each main groove: 8.2 mm
 maximum groove depth of outer portion of first lateral groove: 6.6 mm
 groove depth of each outer portion of second and third lateral grooves: 5.8 mm
 groove depth of each sipe portion: 4.0~5.5 mm
 depth of each sipe: 4.0 mm Wear Resistance Test tires were mounted on all wheels of a front-wheel-drive passenger car with a displacement of 2400 cc under the conditions below. A test driver drove the vehicle 20000 km on a dry asphalt test course, 25% of which was a gravel road. Then, the degree of wear of a tire was measured on main grooves and on each outer portion of lateral grooves. For each main groove and each lateral groove, eight tire circumferential points were picked and measured. Results are shown in average values of the wear measured on each point of the two front wheels. The smaller the value is, the more outstanding the tire is.

rim (all wheels): 7.0Jx17
inflation pressure (all wheels): 240 kPa

Wet Performance

The test vehicle ran the test course, which was set to be wet and had 6-mm-deep puddles formed thereon. The test driver conducted sensory evaluation on running characteristics such as responsiveness of the steering wheel, steering stability during turning, traction, grip performance and the like. The results are shown in ratings, with the evaluation of Comparative Example 1 being set at 100. The greater the value is, the more outstanding the tire is. A 10-point difference between two examples indicates a significant difference in performance, and a 5-point difference between two examples indicates that a difference in performance was observed. The results of the tests are shown in Table 1.

As shown in the test results, tires of the examples demonstrated enhanced wet performance, and were awarded a rating approximately 10 points greater than the tires of the comparative examples. In addition, when tire maximum axial widths of the first to third land sections were changed within a preferred range, the same results were obtained as the test results above.

To enhance the wet performance of a pneumatic tire, main grooves and lateral grooves with a greater volume may be formed in the tread.

However, if a pneumatic tire is structured to have such a tread pattern, problems arise such as reduced rigidity of the pattern and resultant lowering of wear resistance.

A pneumatic tire according to an embodiment of the present invention exhibits well-balanced enhancement of wear resistance while maintaining high wet performance by improving lateral grooves formed to cross each land portion.

According to one aspect of the present invention, the tread of a pneumatic tire includes a first tread edge, multiple main grooves each extending continuously in a tire circumferential direction, multiple land portions bordered by the main grooves, and lateral grooves crossing through the land portions. The land portions include a first land section having the first tread edge, a second land section adjacent to the inner side of the first land section, and a third land section adjacent to the inner side of the second land section. The lateral grooves include first, second and third lateral grooves respectively provided in the first, second and third land sections. Each lateral groove includes an outer portion that extends from the first tread-edge side land periphery and a sipe portion that is connected to the outer portion and

TABLE 1

| | Comp. Examp. 1 | Examp. 1 | Comp. Examp. 2 | Comp. Examp. 3 | Comp. Examp. 4 | Comp. Examp. 5 | Examp. 2 |
|---|---|---|---|---|---|---|---|
| Figure Showing Tread Pattern | FIG. 1 | FIG. 1 | FIG. 1 | FIG. 1 | FIG. 1 | FIG. 1 | FIG. 1 |
| A1/TW (%) | 16 | 15 | 2 | 7 | 15 | 15 | 7 |
| A2/A1 | 0.4 | 0.4 | 1.0 | 1.0 | 0.4 | 0.3 | 0.9 |
| A3/A2 | 0.3 | 0.4 | 1.0 | 0.4 | 1.0 | 0.5 | 0.9 |
| B2/B1 | 1.0 | 1.1 | 0.5 | 0.4 | 1.1 | 1.2 | 2.5 |
| B3/B2 | 1.6 | 1.4 | 0.7 | 1.4 | 0.6 | 1.0 | 1.3 |
| Angle ($\theta_1$) of 1st Lateral Groove (degree) | 5 | 5 | 5 | 5 | 5 | 5 | 5 |
| Angle ($\theta_2$) of 2nd Lateral Groove (degree) | 30 | 30 | 30 | 30 | 30 | 30 | 30 |
| Angle ($\theta_3$) of 3rd Lateral Groove (degree) | 45 | 45 | 45 | 45 | 45 | 45 | 45 |
| Wet Performance [rating: higher the better] | 110 | 110 | 100 | 102 | 110 | 103 | 106 |
| Wear Resistance [mm: smaller the better] | 5.8 | 5.0 | 4.7 | 4.8 | 6.0 | 5.5 | 4.0 |

| | Examp. 3 | Examp. 4 | Examp. 5 | Examp. 6 | Examp. 7 | Examp. 8 |
|---|---|---|---|---|---|---|
| Figure Showing Tread Pattern | FIG. 1 | FIG. 1 | FIG. 1 | FIG. 1 | FIG. 5 | FIG. 6 |
| A1/TW (%) | 15 | 15 | 15 | 15 | 15 | 15 |
| A2/A1 | 0.3 | 0.4 | 0.4 | 0.4 | 0.4 | 0.4 |
| A3/A2 | 0.4 | 0.4 | 0.4 | 0.4 | 0.4 | 0.4 |
| B2/B1 | 1.1 | 1.1 | 1.1 | 1.1 | 1.1 | 1.1 |
| B3/B2 | 1.1 | 1.4 | 1.4 | 1.4 | 1.4 | 1.4 |
| Angle ($\theta_1$) of 1st Lateral Groove (degree) | 5 | 5 | 5 | 5 | 5 | 5 |
| Angle ($\theta_2$) of 2nd Lateral Groove (degree) | 30 | 5 | 30 | 5 | 30 | 30 |
| Angle ($\theta_3$) of 3rd Lateral Groove (degree) | 45 | 45 | 30 | 5 | 45 | 45 |
| Wet Performance [rating: higher the better] | 108 | 108 | 107 | 108 | 108 | 107 |
| Wear Resistance [mm: smaller the better] | 5.0 | 5.2 | 5.3 | 5.4 | 5.0 | 5.0 | extends to the other land periphery opposite the first tread-edge side. The lateral grooves satisfy the following formulas (1) and (2).

$$A1>A2>A3 \quad (1)$$

$$B1<B2<B3 \quad (2)$$

Reference numerals are denoted as follows:

A1~A3 respectively indicate the tire axial lengths of outer portions of first to lateral grooves.

B1~B3 respectively indicate the tire axial lengths of sipes of first to third lateral grooves.

In a pneumatic tire according to an embodiment of the present invention, the first tread edge is preferred to be assigned a specified direction so as to be positioned on the vehicle outer side when mounted.

In a pneumatic tire according to an embodiment of the present invention, the sipe portion of the first lateral groove and the outer portion of the second lateral groove are preferred to make a smooth transition when connected through a main groove between the first land section and the second land section; and the sipe portion of the second lateral groove and the outer portion of the third lateral groove are preferred to make a smooth transition when connected through a main groove between the second land section and the third land section.

In a pneumatic tire according to an embodiment of the present invention, the total number of first lateral grooves is preferred to be the same as that of second lateral grooves and greater than the total number of third lateral grooves.

In a pneumatic tire according to an embodiment of the present invention, angle ($\theta 1$) of the first lateral groove relative to a tire axial direction, angle ($\theta 2$) of the second lateral groove relative to a tire axial direction, and angle ($\theta 3$) of the third lateral groove relative to a tire axial direction are preferred to satisfy the following formula (3).

$$\theta 1 < \theta 2 < \theta 3 \quad (3)$$

A pneumatic tire according to an embodiment of the present invention may have a second tread edge assigned with a specified direction so as to be positioned on the vehicle inner side when mounted. The land portions include a fourth land section having the second tread edge. The fourth land section is preferred to have an inner shoulder lug groove that extends inward from the second tread edge in a tire axial direction and has an inner end that terminates within the fourth land section, and an inner shoulder sipe that connects the inner end of the inner shoulder lug groove to the second tread-edge side land periphery of the fourth land section.

In a pneumatic tire according to an embodiment of the present invention, the inner shoulder lug groove is preferred to have a tie bar elevated from the groove bottom.

In a pneumatic tire according to an embodiment of the present invention, a fifth land section is formed between the third land section and the fourth land section. In the third land section, a first lug groove is formed to extend from the second tread-edge side land periphery toward the first tread edge and to terminate within the third land section. In the fifth land section, a second lug groove is formed to extend from the first tread-edge side land periphery toward the second tread edge and to terminate within the fifth land section. The first lug groove and the second lug groove make a smooth transition when connected through the main groove between the third land section and the fifth land section.

A pneumatic tire according to an embodiment of the present invention has a first land section having a first tread edge, a second land section adjacent to the inner side of the first land section, and a third land section adjacent to the inner side of the second land section. The first, second and third land sections are respectively provided with first, second and third lateral grooves. Each lateral groove includes an outer portion that extends from the first tread-edge side land periphery as well as a sipe portion that is connected to the outer portion and extends to the other land periphery opposite the first tread-edge side. Such a lateral groove discharges water from inside the outer portion to a main groove, and thereby enhances wet performance. In addition, a sipe portion maintains high circumferential rigidity of each land portion, and wear resistance is thereby enhanced. Moreover, since a sipe portion sucks up water screen between the ground and the contact patch of a land portion, drainage capability is enhanced. Each lateral groove satisfies the following formula (1) and (2).

$$A1>A2>A3 \quad (1)$$

$$B1<B2<B3 \quad (2)$$

In the above formulas, A1~A3 respectively indicate the tire axial lengths of outer portions in the first to third lateral grooves, and B1~B3 respectively indicate the tire axial lengths of sipe portions in the first to third lateral grooves.

The contact-patch pressure at the tread-edge side land portion may be lower than that at an inner land portion when a vehicle runs straight. To prevent different degrees of wear in land portions, their tire circumferential rigidities are to be set based on the distribution of the contact-patch pressures. Thus, the tire axial lengths of outer portions are set to gradually decrease from the first land section toward the third land section so that tire circumferential rigidities increase from the first land section toward the third land section. By so setting, degrees of wear are made almost uniform in the first through third land sections.

However, when the tire axial lengths of outer portions are decreased from the first land section toward the third land section, drainage capability is lowered on the first land section side. When the tire axial lengths of sipe portions are gradually increased from the first land section toward the third land section, the ability to suck up water screen on the first land-section side is increased and the drainage capability is enhanced accordingly.

As described above, a pneumatic tire according to an embodiment of the present invention is structured to have first to third land sections that are patterned with lateral grooves. The lateral grooves each include an outer portion and a sipe portion, and the tire axial lengths of the outer portions and sipe portions of those land sections are specified respectively. By so setting, the contact patch of each land portion discharges water efficiently while tire circumferential rigidities are increased gradually from the first land section toward the third land section. Accordingly, a pneumatic tire according to an embodiment of the present invention achieves well-balanced enhancement of wear resistance and wet performance.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a tread having a first tread edge, a plurality of main grooves each extending continuously in a tire circumferential direction, a plurality of land sections bordered by the main grooves, and a plurality of lateral grooves crossing through the land sections,
wherein the plurality of main grooves includes a first main groove, a second main groove, and a third main groove such that the second and third grooves have groove widths that are formed greater than a groove width of the first main groove and that the plurality of land sections includes a first land section having bordered by the first tread edge and the first main groove, a second land section adjacent to an inner side of the first land section and bordered by the first main groove and the second main groove, and a third land section being adjacent to an inner side of the second land section and bordered by the second main groove and the third main groove, each of the lateral grooves includes a first lateral groove, a second lateral groove and a third lateral groove formed in the first land section, the second land section and the third land section, respectively, each of the lateral grooves is formed such that each of the lateral grooves has an outer portion that extends from a first tread-edge side land periphery and a sipe portion that is connected to the outer portion and extends to the other side land periphery on an opposite side with respect to a first tread-edge side, the lateral grooves satisfy A1>A2>A3 and B1<B2<B3, where A1 represents a tire axial length of the outer portion of the first lateral groove, A2 represents a tire axial length of the outer portion of the second lateral groove, A3 represents a tire axial length of the outer portion of the third lateral groove, B1 represents a tire axial length of the sipe portion of the first lateral groove, B2 represents a tire axial length of the sipe portion of the second lateral groove, and B3 represents a tire axial length of the sipe portion of the third lateral groove, and the first lateral groove, the second lateral groove and the third lateral groove are formed such that an angle $\theta 1$ of the first lateral groove relative to a line in a tire axial direction at a center position of the first lateral groove, an angle $\theta 2$ of the second lateral groove relative to a line in the tire axial direction at a center position of the second lateral groove, and an angle $\theta 3$ of the third lateral groove relative to a line in the tire axial direction at a center position of the third lateral groove satisfy $\theta 1<\theta 2<\theta 3$.

2. The pneumatic tire according to claim 1, wherein the tread has the first tread edge that determines a tire axially outermost contact-patch position on a vehicle outer side when mounted in a mounting direction.

3. The pneumatic tire according to claim 2, wherein the tread has a second tread edge that determines a tire axially outermost contact-patch position on a vehicle inner side when mounted in the mounting direction, the plurality of land sections includes a fourth land section having the second tread edge, and the fourth land section has an inner shoulder lug groove extending inward from the second tread edge in a tire axial direction and having an inner end terminating within the fourth land section, and an inner shoulder sipe connecting the inner end of the inner shoulder lug groove to a second tread-edge side land periphery of the fourth land section.

4. The pneumatic tire according to claim 3, wherein the inner shoulder lug groove has a tie bar elevated from a groove bottom of the inner shoulder lug groove.

5. The pneumatic tire according to claim 4, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

6. The pneumatic tire according to claim 3, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

7. The pneumatic tire according to claim 2, wherein the sipe portion of the first lateral groove and the outer portion of the second lateral groove are formed such that the sipe portion of the first lateral groove and the outer portion of the second lateral groove make a smooth transition through the first main groove between the first land section and the second land section, and the sipe portion of the second lateral groove and the outer portion of the third lateral groove are formed such that the sipe portion of the second lateral groove and the outer portion of the third lateral groove make a smooth transition through the second main groove between the second land section and the third land section.

8. The pneumatic tire according to claim 7, wherein the plurality of lateral grooves is formed such that a total number of first lateral grooves is set to be equal to a total number of second lateral grooves and greater than a total number of third lateral grooves.

9. The pneumatic tire according to claim 2, wherein the plurality of lateral grooves is formed such that a total number of first lateral grooves is set to be equal to a total number of second lateral grooves and greater than a total number of third lateral grooves.

10. The pneumatic tire according to claim 1, wherein the sipe portion of the first lateral groove and the outer portion of the second lateral groove are formed such that the sipe portion of the first lateral groove and the outer portion of the second lateral groove make a smooth transition through the first main groove between the first land section and the second land section, and the sipe portion of the second lateral groove and the outer portion of the third lateral groove are formed such that the sipe portion of the second lateral groove and the outer portion of the third lateral groove make a smooth transition through the second main groove between the second land section and the third land section.

11. The pneumatic tire according to claim 10, wherein the tread has a second tread edge that determines a tire axially outermost contact-patch position on a vehicle inner side when mounted in the mounting direction, the plurality of land sections includes a fourth land section having the second tread edge, and the fourth land section has an inner shoulder lug groove extending inward from the second tread edge in a tire axial direction and having an inner end terminating within the fourth land section, and an inner shoulder sipe connecting the inner end of the inner shoulder lug groove to a second tread-edge side land periphery of the fourth land section.

12. The pneumatic tire according to claim 11, wherein the inner shoulder lug groove has a tie bar elevated from a groove bottom of the inner shoulder lug groove.

13. The pneumatic tire according to claim 12, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

14. The pneumatic tire according to claim 11, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

15. The pneumatic tire according to claim 10, wherein the plurality of lateral grooves is formed such that a total number of first lateral grooves is set to be equal to a total number of second lateral grooves and greater than a total number of third lateral grooves.

16. The pneumatic tire according to claim 1, wherein the plurality of lateral grooves is formed such that a total number of first lateral grooves is set to be equal to a total number of second lateral grooves and greater than a total number of third lateral grooves.

17. The pneumatic tire according to claim 16, wherein the tread has a second tread edge that determines a tire axially outermost contact-patch position on a vehicle inner side when mounted in the mounting direction, the plurality of land sections includes a fourth land section having the second tread edge, and the fourth land section has an inner shoulder lug groove extending inward from the second tread edge in a tire axial direction and having an inner end terminating within the fourth land section, and an inner shoulder sipe connecting the inner end of the inner shoulder lug groove to a second tread-edge side land periphery of the fourth land section.

18. The pneumatic tire according to claim 17, wherein the inner shoulder lug groove has a tie bar elevated from a groove bottom of the inner shoulder lug groove.

19. The pneumatic tire according to claim 18, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

20. The pneumatic tire according to claim 17, wherein the tread has a fifth land section formed between the third land section and the fourth land section, a first lug groove formed in the third land section to extend from the second tread-edge side land periphery toward the first tread edge and to terminate within the third land section, and a second lug groove formed in the fifth land section to extend from the first tread-edge side land periphery toward the second tread edge and to terminate within the fifth land section such that the first lug groove and the second lug groove make a smooth transition through the third main groove between the third land section and the fifth land section.

* * * * *